United States Patent [19]

DeRoy

[11] 4,248,412
[45] Feb. 3, 1981

[54] SUPPORT FOR SHARPENING CHAIN SAWS AT THE WORK SITE

[76] Inventor: Léonce DeRoy, 3464 Saint-Samuel St., Beauport, Prov. of Quebec, Canada, G1C 3T8

[21] Appl. No.: 109,788

[22] Filed: Jan. 7, 1980

[51] Int. Cl.³ .............................................. B23Q 3/02
[52] U.S. Cl. ..................................... 269/102; 76/36; 76/78 R; 269/296
[58] Field of Search ............... 269/101, 102, 246, 296, 269/297, 212, 207, 321 W; 76/36, 78 R, 78 A, 25 A; 51/217 R, 217 P

[56] References Cited

U.S. PATENT DOCUMENTS

| 2,469,527 | 5/1949 | Stifflemire | 76/78 R |
| 2,693,724 | 11/1954 | Currie | 76/78 R |
| 3,029,663 | 4/1962 | Thar | 76/78 R |
| 3,877,324 | 4/1975 | Silvey | 76/25 A |
| 4,109,900 | 8/1978 | Vandecoevering | 269/102 |

Primary Examiner—Robert C. Watson

[57] ABSTRACT

A support for sharpening chain saws is disclosed consisting of an L-shaped member having a threaded spike adapted to be screwed into the cut surface of a tree trunk. The horizontal arm of the member is provided with clamping means to hold fast the blade of the chain saw. A second, straight member adapted to support the handle or safety guard of the chain saw is height-adjustably secured to the vertical arm of the L-shaped member. The chain saw is held in upside down position for easy access to the chain teeth to be sharpened.

3 Claims, 4 Drawing Figures

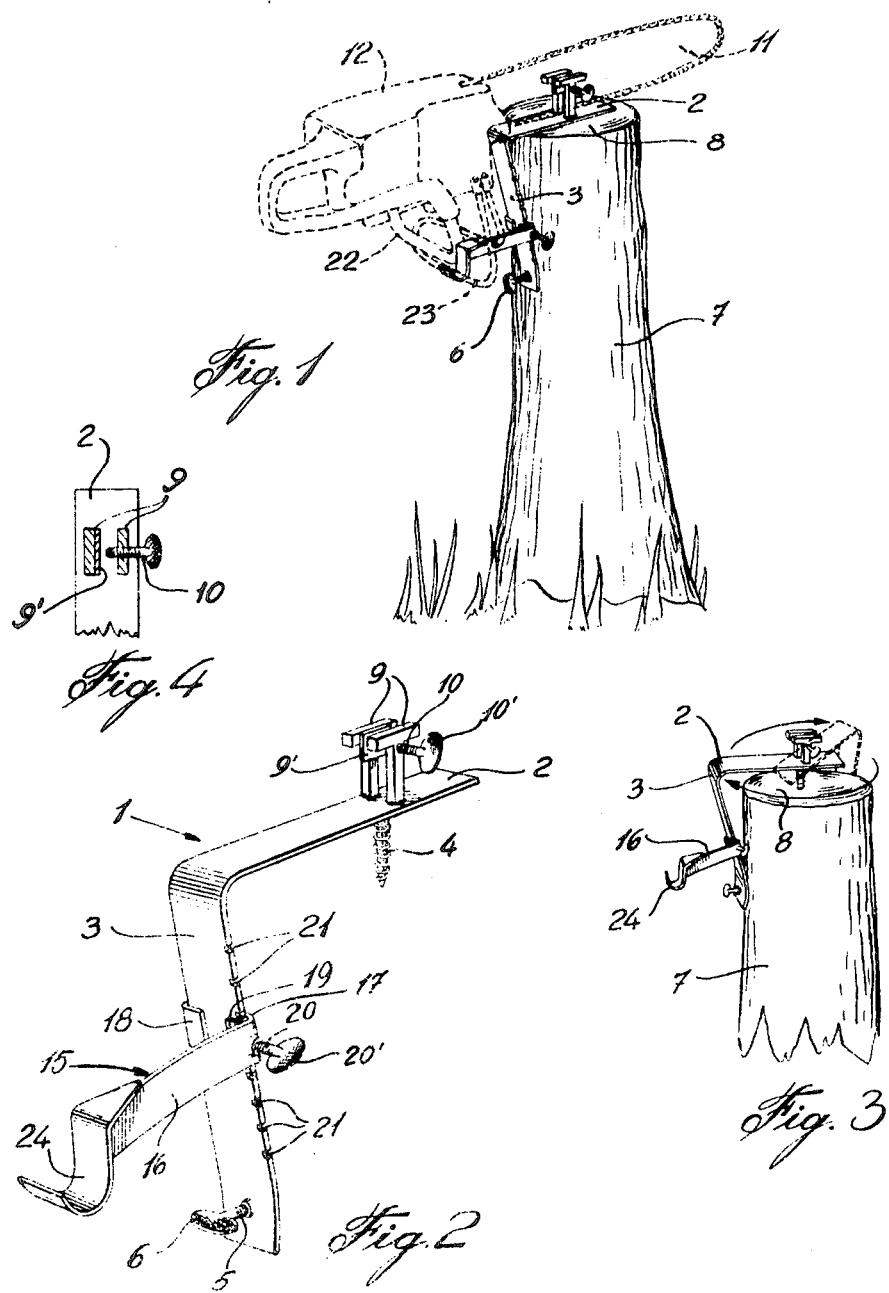

SUPPORT FOR SHARPENING CHAIN SAWS AT THE WORK SITE

FIELD OF THE INVENTION

This invention relates to clamps used to immobilize chain saws for sharpening, specifically to a clamp or support means adapted for use whenever lumbering is going on.

BACKGROUND OF THE INVENTION

Support means for sharpening chain saws have been constructed in the past. For instance, U.S. Pat. No. 3,877,324 teaches a stand for grinding saw chain including a complicated clamp and a grinder. Not only is this unit quite expensive but it could not be used at a lumbering work site, being difficult to carry and needing a power source for the grinder. It is important to keep the teeth of a chain saw sharp and it is frequently necessary to sharpen the teeth in the middle of the working day. To this end, U.S. Pat. No. 3,029,663 has been proposed. However, the clamp disclosed therein requires a fallen log or a very large tree stump. Fallen logs are not always available, having been cleared away; large trees grow in limited areas.

OBJECTS OF THE INVENTION

It is therefore the first object of the present invention to provide a support means for sharpening chain saws which may be conveniently used at any lumbering work site.

It is another object of the invention to provide a support means of the type described which is adaptable to any make of chain saw.

It is yet another object of the invention to provide a support means of the type described which is simple in design and non-costly to produce.

SUMMARY OF THE INVENTION

The preferred embodiment of the invention comprises an L-shaped rigid member provided on the underside of its horizontal arm with a rigidly secured screw adapted to be screwed into the top surface of a tree trunk.

The lower end of the vertical arm is preferably provided with means to secure the latter to the side of the tree trunk. A horizontal outwardly projecting support member is attached to the vertical arm. Preferably, said support member is provided with attachment means at its inner end whereby it may be secured in a plurality of vertical positions to the vertical arm of the L-shaped member to accommodate different makes and sizes of chain saws. The outer end of the support member has a support for the handle of a chain saw.

The top surface of the horizontal arm of the L-shaped member is provided with clamping means adapted to detachably hold fast the blade of the chain saw. The support means of the invention holds the chain saw in upside down position for easier access to the chain teeth to be sharpened.

The above will be more clearly understood by referral to the preferred embodiment of the invention illustrated by way of the accompanying drawings in which:

BRIEF DESCRIPTION OF THE DRAWINGS

FIG. 1 is a perspective view of the invention secured to a tree trunk, showing a chain saw in dashed outline clamped to the invention;

FIG. 2 is a perspective view of the support;

FIG. 3 is a perspective view of a part of a tree trunk and also showing how the invention is secured to the tree trunk; and FIG. 4 is a partial top plan view of the outer end of the horizontal arm, also showing the clamping means in plan section.

Like numerals refer to like elements throughout the drawings.

DETAILED DESCRIPTION OF THE INVENTION

The invention includes an L-shaped member 1 made of rigid material having a horizontal arm 2 and a vertical arm 3. The underside of horizontal arm 2 is provided with a rigidly secured, downwardly projecting threaded spike 4. The lower end of vertical arm 3 is provided with a screw 5 having a winged head 6 and adapted to abut against or screw into the side of a tree trunk 7.

FIG. 3 shows how the invention is secured to tree trunk 7: threaded spike 4 is first pushed in contact with the cut surface 8 of tree trunk 7; then member 1 is simply turned around the latter, thus screwing spike 4 into the tree trunk 7. A very secure attachment is obtained. The screw 5 is screwed into, or abutted against the bark or side of tree trunk 7 to complete the operation.

The top surface of horizontal arm 2 is provided with clamping means for the blade of a chain saw. This means consists of a pair of upright T-shaped rigid members 9 which are parallel and spaced-apart such that there is room for the blade and chain of a chain saw. One T-shaped member 9 has a small flat plate 9' secured at its upper inner surface opposite to a clamping screw 10 which is adjustably screwed into a threaded hole provided in the upper portion of the other T-shaped member 9. Clamping screw 10 has a winged head 10'. It will be readily seen that the blade 11 of a power saw 12 is first placed between the two T-shaped members 9 and then fixedly clamped in place by turning clamping screw 10 inwardly so that flat plate 9' and screw 10 engage the opposite surfaces of blade 11.

A support means 15 is provided for supporting the handle of a chain saw 12. Support means 15 consists of a rigid, straight member 16 having a transverse U-shaped bracket 24 secured to its outer end. The inner end of member 16 is bent transversely at 17 and at 180 degrees at its extreme end to form a clamp flange 18. A corresponding transverse flange 19 is also secured to member 16 at bend 17. A screw 20 having a winged head 20' screws into a hole provided therefor in bend 17 and is adapted to engage anyone of a plurality of vertically-spaced notches 21 made in one side edge of vertical arm 3. Thus straight member 16 may be positioned at a desired height whereby the handle 22 or safety guard 23 of a chain saw 12 is supported by bracket 24. The adjustable height of member 16 accommodates various sizes and makes of chain saws.

It is to be noted that chain saw 12 is clamped upside down to the invention for easier access to the teeth to be sharpened.

It is to be also noted that no tools are needed to secure a chain saw 10 to the support means of the invention and that both hands are left free for the sharpening operation.

I claim:

1. A support for sharpening a chain saw comprising an L-shaped rigid member having a horizontal arm and a vertical arm; said horizontal arm being provided with a threaded spike secured to its underside and a rigidly secured clamping means on its top surface adapted to detachably hold fast the blade of a chain saw; further comprising an outwardly, longitudinally projecting rigid support member secured to said vertical arm to support the handle or safety guard of a chain saw in upside down position.

2. A support as defined in claim 1, wherein said support member is provided with a second clamping means at its inner end, said second clamping means releasably clampable on said vertical arm, whereby said support member may be adjustably vertically positioned on said vertical arm to accommodate various sizes and makes of chain saws.

3. A support as defined in claims 1 or 2, further including a screw threaded through the lower end of said vertical arm and adapted to abut or screw into the side of a tree trunk.

* * * * *